Aug. 28, 1951  C. L. MOURFIELD  2,565,618
SIMULTANEOUS EXPOSURE CAMERA
Filed Sept. 19, 1949  2 Sheets-Sheet 1
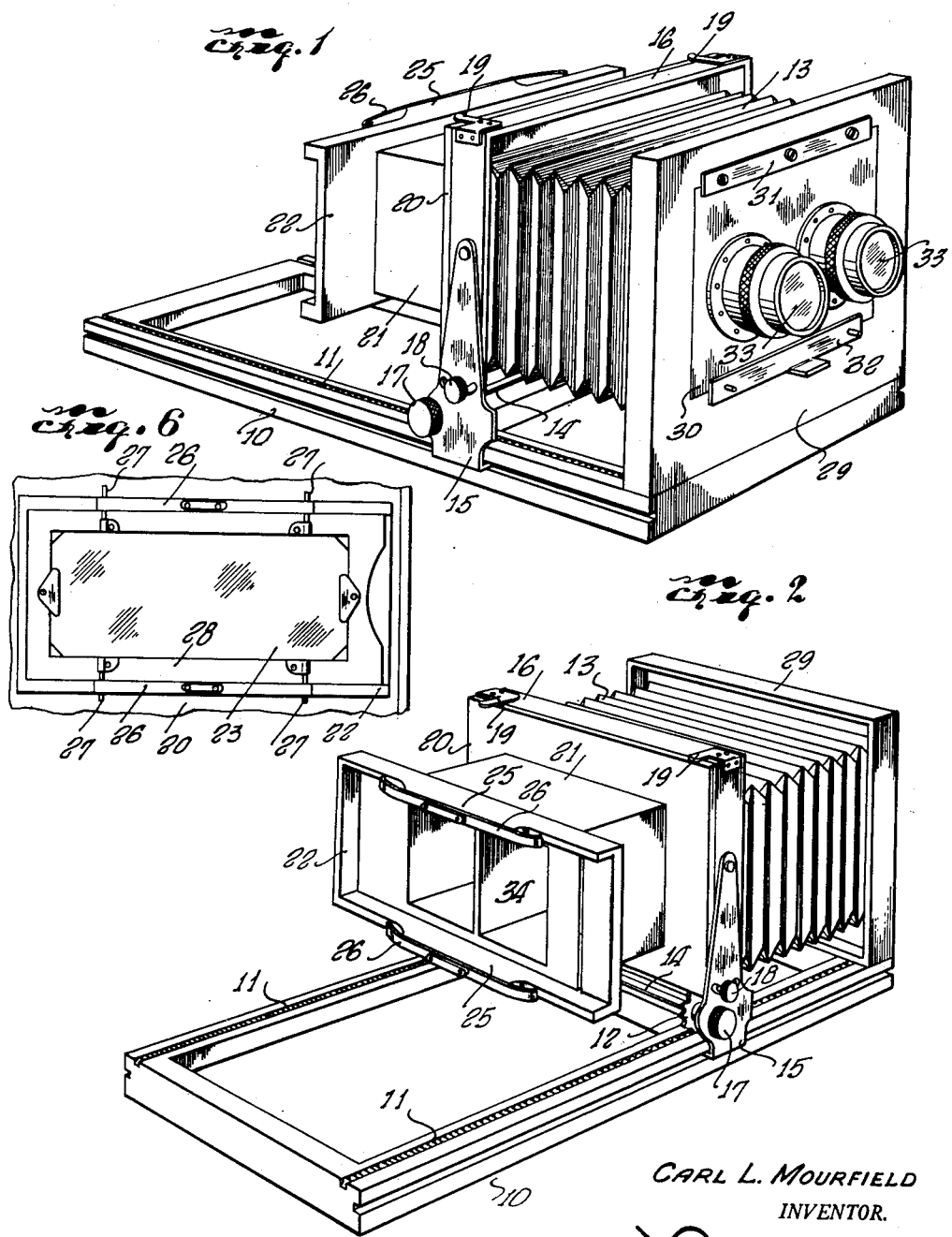
CARL L. MOURFIELD
INVENTOR.
ATTORNEY

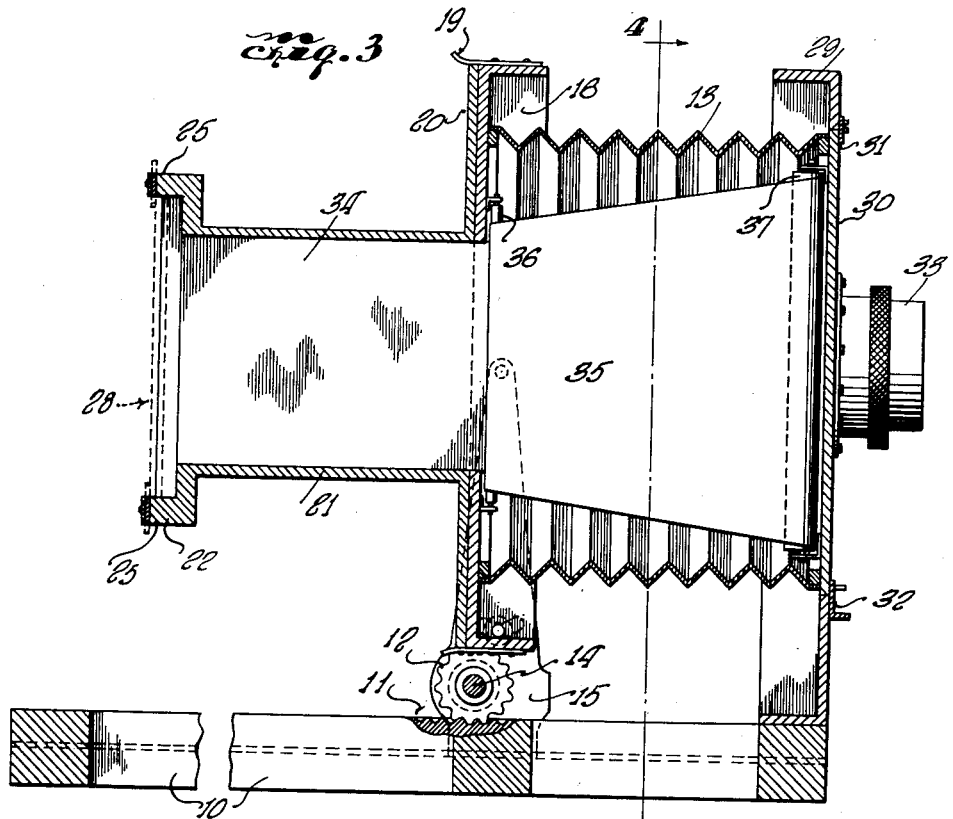
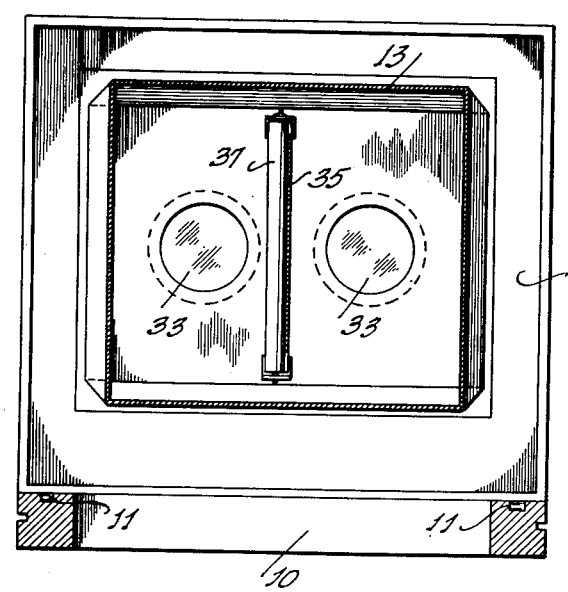
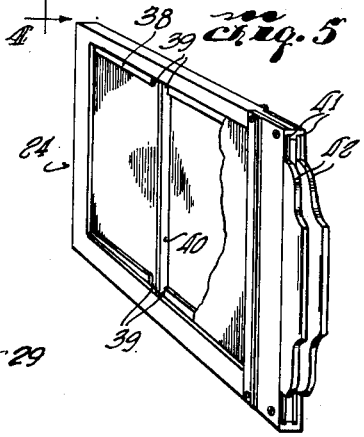

Patented Aug. 28, 1951

2,565,618

UNITED STATES PATENT OFFICE 2,565,618

SIMULTANEOUS EXPOSURE CAMERA

Carl L. Mourfield, Dallas, Tex.

Application September 19, 1949, Serial No. 116,535

1 Claim. (Cl. 95—18)

This invention relates to cameras and it has particular reference to a camera for making simultaneous exposures on separate films.

The principal object of the invention is to so equip the conventional studio camera that two exposures can be made simultaneously, one on photographic paper film and the other on negative photographic film through the medium of complementary photographic lenses and a common ground glass focusing screen on which appear, side by side, identical images of the subject as viewed through the lenses. The film holder and slide are slid into position in the camera in a manner not unlike conventional practice but the film holder is designed to receive in side by side relationship the photographic paper film and the photographic negative film so that the exposures will be simultaneous. In this manner, immediate selection by the subject from proofs made on the photographic paper film may be effected, thus obviating the time consuming and comparatively expensive practice of making contact prints from the photographic negative film on photosensitized paper, serving as proofs.

Another object of the invention is to provide a studio camera of the bellows type, having a detachable or interchangeable lens board and an extensible partition separating the chamber of the camera into two sections, one being individual to the photographic paper film while the other section provides for exposure of the photographic negative film.

Still another object of the invention is to provide a medium for making simultaneous exposures on separate films which will require no skill to accomplish beyond that ordinarily possessed by a photographer.

Other objects will appear as the description proceeds, taken in connection with the accompanying drawing wherein:

Figure 1 is a front perspective view of a studio camera equipped with the invention.

Figure 2 is a rear perspective view thereof.

Figure 3 is a view in longitudinal section on a slightly larger scale.

Figure 4 is a vertical sectional view, taken on line 4—4 of Figure 3.

Figure 5 is a perspective view of a film holder constructed according to the invention, and Figure 6 is a fragmentary rear elevational view of the camera showing the ground glass focusing screen.

Continuing with a more detailed description of the drawing, reference numeral 10 denotes the base of the camera, incorporating parallel racks 11 which latter are engaged by pinions 12 as a means for expanding and contracting the bellows 13 in focusing the camera. The pinions 12 are mounted on each end of a shaft 14, which latter has its ends journaled in the lower ends of brackets 15. The brackets 15 are secured to the ends of the rear frame 16, to which the rear end of the bellows 13 is attached and light sealed, as shown in Figure 3. A knurled knob 17 is affixed to one end of the shaft 14, by which it is rotated. A locking screw 18 is provided adjacent the knob 17 to secure the bellows in adjusted positions.

Attached by means of conventional spring latches 19 to the rear frame 16 is a plate 20, having an opening which communicates with the bellows 13, the opening being embraced by a box 21 defining a viewing chamber. This chamber extends rearwardly and carries on its rear end a frame 22 which is adapted to support the ground glass focusing screen 23 (Figure 6) as well as the film holder generally designated by reference numeral 24 in Figure 5.

The frame 22 is shown as having parallel protrusions 25 along its upper and lower edges, and to each of these protrusions is attached a leaf spring 26 at its midsection. The ends of these springs are free to receive pins 27 extending outwardly from the frame 28 (Fig. 6) in which is mounted the ground glass focusing screen 23. The springs 26 make possible the slight rearward displacement of the focusing screen 23 necessary for the insertion of the film holder 24 into the frame 22 in front of the focusing screen to expose the film in the holder after the preliminary work of posing the subject and focusing the lenses has been accomplished.

The foregoing description deals with the more or less standard or conventional photographing equipment while the description to follow reveals the invention and its relationship to such conventional equipment.

The front frame 29 of the camera to which the forward end of the bellows 13 is affixed, is provided with an opening to accommodate a lens board 30. This lens board is removably attached to the frame 29 by means of a fixed strip 31 at the top thereof and a displaceable strip 32 at the bottom. This fastening means is also of conventional manufacture. Photographic lenses 33 are mounted in the lens board 30 and are adapted to be simultaneously focused on the subject so that the latter's image will appear in duplication on the focusing screen 23.

In order that the light admitted by the lenses 33 into the camera will be restricted to the respective image field of each lens, a partition 34 is provided longitudinally in the box 21 and, as a continuation of this partition, a longitudinally extensible partition 35 is arranged in the bellows 13. The extensible partition 35 consists of a strip of fabric or like material, one end of which is affixed to a bracket 36, mounted on the inner face of the rear bellows frame 16. The opposite end of the strip is attached to a roller 37 (Figs. 3 and 4) which is spring controlled in the manner of a window shade roller, the spring (not shown) maintaining the fabric partition always under tension. It is obvious therefore that the partitions 34 and 35 will prevent exchange of light admitted by the lenses 33 from one section of the camera chamber to the other and the possible clouding of the film.

The film holder 24 may be of one piece, as shown in Figure 5 or in two parts, as desired. In the form shown, a channel 38 is provided about the perimeter of the film holder, which is interrupted at the midsection of the holder by notches 39 on opposite sides of the latter. A dividing rib 40 separates the holder into two end sections, one being adapted to receive a sheet of photographic paper film while the companion section retains a sheet of photographic negative film, the film being inserted into the retaining channel 38 through the notches 39.

Opposite sides of the film holder are channeled at 41 which channels are adapted to receive film slides 42 (Fig. 5) in the conventional manner.

Procedure in operating the camera in taking pictures is substantially the same as is conventionally followed. After posing the subject and obtaining accurate focus, determined by the clearly defined, duplicate images revealed on the focusing screen 23, the film holder 24, with the photographic paper film in one side and the photographic negative film in the other is slid into position in the frame 22 forwardly of the focusing screen 23. To expose the film in the holder, the front side 42 is withdrawn from the latter so that an image will be impressed on each film upon the operation of a conventional shutter. Afterwards, the slide 42 is restored to its channel in the holder and the latter is removed to the dark room where the films are removed for developing. If it is desired that the subject be shown proofs for immediate selection of finished portraits, the paper film alone may be developed.

It is of course desirable that corresponding identifying marks be applied to the films in the holder so that when a selection is made from the paper proof, a picture can be made by developing the corresponding photographic negative film. Such marking may be applied manually but it is recommended that the automatic serially numbering device described in U. S. Letters Patent No. 2,478,301 be employed in conjunction with the camera herein described.

Manifestly, the construction as shown and described is capable of some modification and such modification as may be construed to fall within the scope and meaning of the appended claim is also considered to be within the spirit and intent of the invention.

What is claimed is:

In a bellows camera for making simultaneous exposures, one on flat paper film and the other on photographic negative film, a flexible partition in said camera defining separate longitudinal chambers, a spring controlled roller mounted in the forward end of said camera on which is wound one end of said flexible partition, a second roller in the rear of said camera on which the opposite end of said partition is wound, a photographic lens individual to each chamber of said camera, a common focusing screen on which identical images are impressed through said lenses, and means for holding photographic paper film and photographic negative film for exposure simultaneously through said lenses.

CARL L. MOURFIELD.

REFERENCES CITED

The following references are of record in the file of this patent:

UNITED STATES PATENTS

| Number | Name | Date |
|---|---|---|
| 709,480 | Goerz | Sept. 23, 1902 |
| 738,066 | Reichenbach | Sept. 1, 1903 |
| 2,478,301 | Mourfield | Aug. 9, 1949 |

FOREIGN PATENTS

| Number | Country | Date |
|---|---|---|
| 49,135 | Germany | Oct. 18, 1889 |